(12) United States Patent
Chen

(10) Patent No.: US 9,187,006 B2
(45) Date of Patent: Nov. 17, 2015

(54) VEHICLE POSITIONING FOR WIRELESS CHARGING SYSTEMS

(71) Applicants: VOLKSWAGEN AG, Wolfsburg (DE); AUDI AG, Ingolstadt (DE)

(72) Inventor: Henry Chen, Mountain View, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 189 days.

(21) Appl. No.: 14/018,554

(22) Filed: Sep. 5, 2013

(65) Prior Publication Data

US 2015/0061576 A1 Mar. 5, 2015

(51) Int. Cl.
*G06F 17/50* (2006.01)
*B60L 11/18* (2006.01)

(52) U.S. Cl.
CPC ........... *B60L 11/1833* (2013.01); *B60L 11/182* (2013.01); *B60L 11/1825* (2013.01); *B60L 11/1829* (2013.01); *B60L 11/1835* (2013.01); *B60L 2230/16* (2013.01); *B60L 2250/16* (2013.01); *B60L 2260/32* (2013.01)

(58) Field of Classification Search
CPC ....................................................... H02J 5/005
USPC ........................................................ 320/108
See application file for complete search history.

(56) References Cited

U.S. PATENT DOCUMENTS

| | | | |
|---|---|---|---|
| 8,823,551 B1 * | 9/2014 | Hoffman | 340/932.2 |
| 2011/0199049 A1 | 8/2011 | Nagy | |
| 2011/0254504 A1 | 10/2011 | Haddad et al. | |
| 2012/0200151 A1 * | 8/2012 | Obayashi et al. | 307/9.1 |
| 2013/0037365 A1 * | 2/2013 | Ichikawa | 191/10 |
| 2013/0038272 A1 * | 2/2013 | Sagata | 320/106 |
| 2013/0181669 A1 * | 7/2013 | Kawasaki | 320/108 |
| 2014/0067660 A1 * | 3/2014 | Cornish | 705/39 |
| 2014/0092236 A1 * | 4/2014 | Findeisen et al. | 348/118 |
| 2014/0121586 A1 * | 5/2014 | Bertrand et al. | 604/9 |
| 2014/0174870 A1 * | 6/2014 | Niizuma | 191/10 |
| 2014/0191586 A1 * | 7/2014 | Ichikawa | 307/104 |
| 2014/0265555 A1 * | 9/2014 | Hall et al. | 307/9.1 |
| 2014/0371966 A1 * | 12/2014 | Ohashi et al. | 701/22 |
| 2015/0073642 A1 * | 3/2015 | Widmer et al. | 701/22 |

FOREIGN PATENT DOCUMENTS

| | | |
|---|---|---|
| WO | 2011110924 A1 | 9/2011 |
| WO | 2013019566 A1 | 2/2013 |

* cited by examiner

*Primary Examiner* — Suchin Parihar
(74) *Attorney, Agent, or Firm* — Barnes & Thornburg LLP

(57) ABSTRACT

A wireless vehicle charging system includes a charging station and an electric or hybrid passenger vehicle. The charging station is configured to wirelessly provide power to the passenger vehicle when the passenger vehicle is properly positioned in the charging station. The wireless vehicle charging system also includes a positioning system configured to guide the passenger vehicle into the charging station so that the passenger vehicle is properly positioned in the charging station to receive power from the charging station.

23 Claims, 9 Drawing Sheets

VEHICLE POSITIONING FOR WIRELESS CHARGING SYSTEMS

BACKGROUND

The present disclosure relates to electric and hybrid vehicles. More specifically, the present disclosure is directed to wireless charging of electric and hybrid vehicles.

SUMMARY

According to the present disclosure, a wireless vehicle charging system includes a charging station, an electric or hybrid passenger vehicle, and a positioning system. The charging station is configured to provide power to the passenger vehicle when the passenger vehicle is properly positioned relative to the charging station. The positioning system is configured to guide a driver moving the passenger vehicle into the charging station so that the passenger vehicle is properly positioned to receive power from the charging station.

In illustrative embodiments, the positioning system includes a locator unit, a camera, and a control system. The locator unit is arranged in a predetermined position relative to the charging station and the camera is mounted to the passenger vehicle. The camera is configured to detect the locator and to provide information about the locator to the control system. The control system is configured to provide guidance based on information about the locator from the camera.

In illustrative embodiments, the locator includes at least three beacons. The beacons are arranged in two spaced apart vertical planes and are illustratively infrared light-emitting diodes. The camera is configured to detect infrared light from the beacons and to send that information to the control system so that the control system can provide guidance information to a driver or an autonomous pilot system.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 4 is a top plan view of the wireless vehicle charging system of FIGS. 1-3 showing the passenger vehicle improperly positioned within the charging station and showing the camera included in the positioning system detecting the set of beacons;

DETAILED DESCRIPTION

Figure 1:
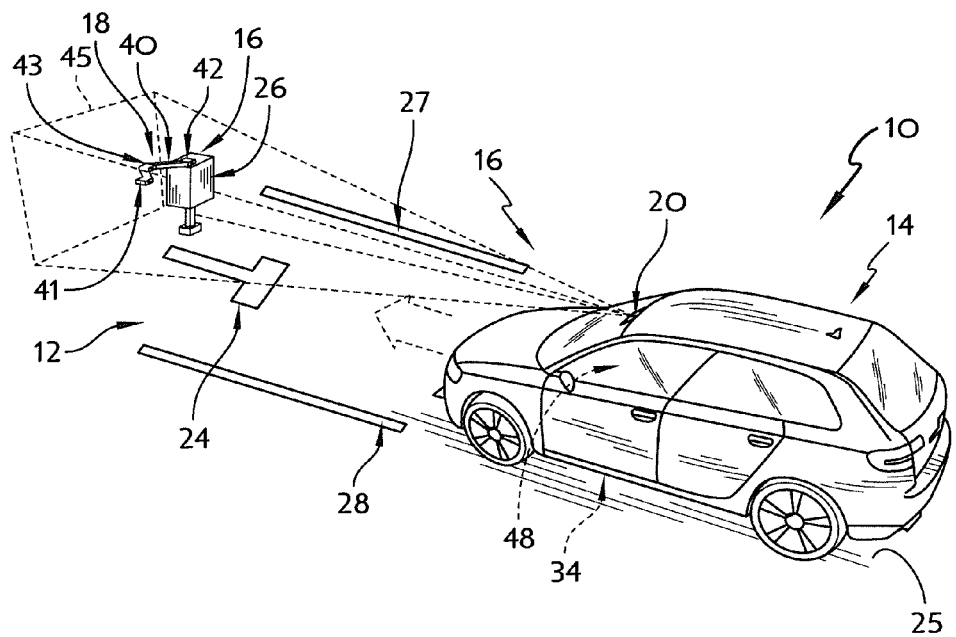
FIG. 1 is a perspective view of a wireless vehicle charging system including a charging station and an electric or hybrid passenger vehicle showing the passenger vehicle spaced apart from the charging station before it is guided into a proper position within the charging station by a positioning system provided in the wireless vehicle charging system and showing that the positioning system includes a camera mounted to the passenger vehicle and a set of beacons located at the charging station.
Figure 2:
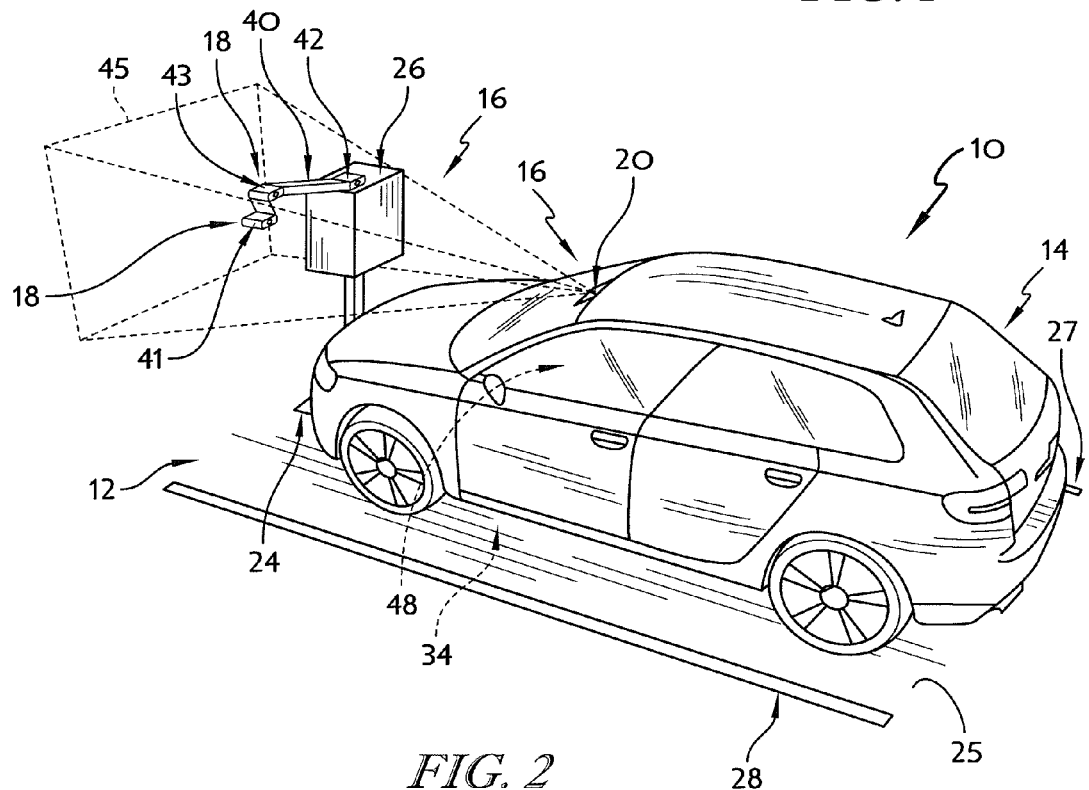
FIG. 2 is similar to FIG. 1 showing the passenger vehicle properly positioned within the charging station to faciliatate charging of a battery included in the passenger vehicle.

According to the present disclosure, a wireless vehicle charging system 10 includes a charging station 12 and an electric or hybrid passenger vehicle 14 as shown, for example, in FIGS. 1 and 2. The charging station 12 is configured to provide power to the passenger vehicle 14 when the passenger vehicle 14 is properly positioned relative to the charging station 12 as suggested in FIG. 2. The illustrative wireless vehicle charging system 10 also includes a positioning system 16 configured to guide a driver or an automomous pilot system moving the passenger vehicle 14 into the charging station 12 so that the passenger vehicle 14 is properly positioned to receive power from the charging station 12. The positioning system 16 illustratively includes a locator unit 18 having a set of beacons 41, 42, 43 arranged in a predetermined pattern relative to the charging station 12 and a camera 20 mounted to the passenger vehicle 14 to detect the beacons 41, 42, 43 as shown in FIGS. 1 and 2.

The illustrative charging station 12 includes a charger induction coil 24, a power station 26, and a pair of marking stripes 27, 28 as shown in FIGS. 1 and 2. The charger induction coil 24 is illustratively configured to be energized to wirelessly provide power to a vehicle induction coil 34 arranged in a predefined position relative to the charger induction coil 24. The power station 26 is coupled to the charger induction coil 24 and provides electrical power to energize the charger coil 24. The marking stripes 27, 28 are marked on the ground 25 and are laterally-spaced apart from one another to provide general guidance to a user moving the passenger vehicle 14 into the charging station 12.

The charger induction coil 24 is illustratively mounted on the ground 25 and is laterally spaced about midway between the marking stripes 27, 28. In other embodiments, the charger induction coil 24 may be buried in the ground 25 and/or may be mounted to a ceiling above the ground 25.

Figure 3:
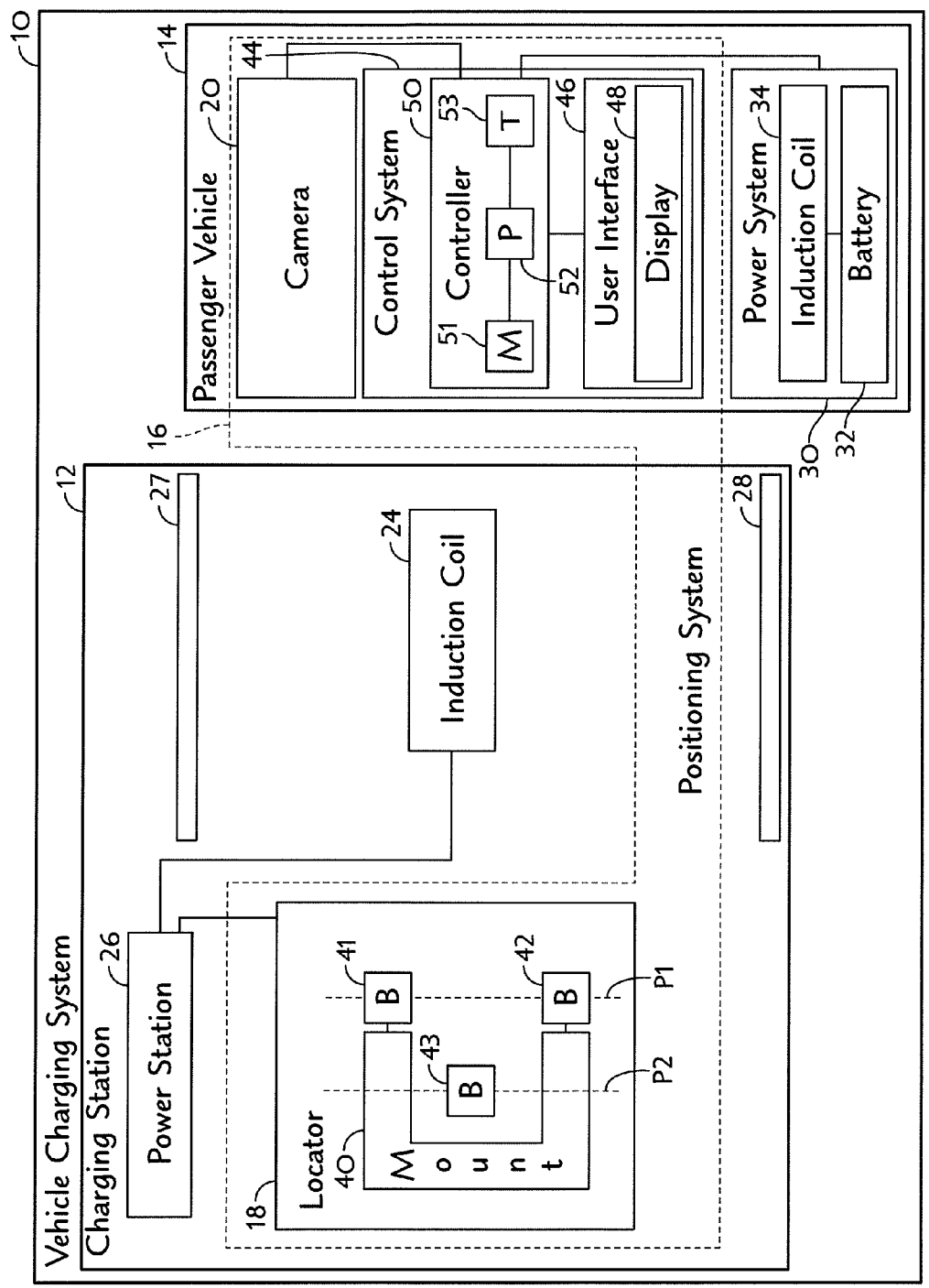
FIG. 3 is a diagrammatic view of the wireless vehicle charging system of FIGS. 1 and 2 showing that the positioning system includes the camera mounted in the passenger vehicle, the set of beacons mounted in the charging station, and a control system having a controller and a display mounted in the passenger vehicle.

The passenger vehicle 14 illustratively includes a power system 30 having a battery 32 and the vehicle induction coil 34 as shown diagrammatically in FIG. 3. The battery 32 is illustratively a rechargeable power storage unit that may be charged by a wireless charger, a wired charger, a combustion engine, and/or a braking system. The vehicle induction coil 34 is coupled to the battery 32 and is configured to receive power from the charger induction coil 24 and to transmit power from the charger induction coil 24 to the battery 32. More specifically, the vehicle induction coil 34 is configured to receive and transmit power from the charger induction coil 24 when the vehicle induction coil 34 is arranged in a predefined position relative to the charger induction coil 24.

The positioning system 16 described herein provides means for guiding a driver moving the passenger vehicle 14 into the charging station 12 so that the driver can ensure that the vehicle induction coil 34 is arranged in a predefined position relative to the charger induction coil 24 that allows receipt of power by the vehicle induction coil 34 as suggested in FIGS. 4-7. In the illustrative embodiment, the positioning system 16 includes the locator 18, the camera 20, and a control system 44 as shown diagrammatically in FIG. 3. The locator 18 includes the beacons 41, 42, 43 and is mounted in a predetermined position relative to the charger induction coil 24 of the charging station 12. The camera 20 is mounted to the passenger vehicle 14 and is configured to detect the beacons 41, 42, 43 of the locator 18 when the beacons 41, 42, 43 fall within the field of view 45 of the camera 20 as suggested in FIGS. 1 and 2. The control system 44 is configured to receive information from the camera 20 and to provide guidance information to a driver of the passenger vehicle 14.

In the illustrative embodiment, the locator 18 is arranged along one end of the marking stripes 27, 28 about midway between the marking stripes 27, 28 as shown, for example, in FIG. 3. The locator 18 includes a mount 40 and beacons 41, 42, 43. The mount 40 is coupled to the beacons 41, 42, 43 and supports the beacons 41, 42, 43 in two spaced apart vertical planes P1 and P2. More specifically, first and second beacons 41, 42 are supported in the first vertical plane P1 and third beacon 43 is supported in second vertical plane P2. In the illustrative embodiment, each beacon 41, 42, 43 is an light-emitting diode (LED) powered by the power station 26 to produce infrared light. In other embodiments, the beacons 41, 42, 43 may be other light-emitting devices and/or may product other wavelengths of light.

The camera 20 is mounted to the passenger vehicle 14 and detects infrared light within a field of view 45 that extends out in front of the passenger vehicle 14 as suggested in FIGS. 1 and 2. The camera 20 is coupled to the control system 44 and is configured to communicate information relating to detected infrared light of the control system 44 so that the control system 44 can process the information to determine a position of the passenger vehicle 14 relative to the beacons 41, 42, 43 of the locator 18.

The control system 44 illustratively includes a user interface 46 having a display 48 and a controller 50 coupled to the user interface 46 as shown in FIG. 3. The display 48 is illustratively mounted in the passenger vehicle 14 and arranged to be viewed by a driver of the passenger vehicle 14 so that the controller 50 can present information to the driver via the display 48. The controller 50 is also coupled to the camera 20 and to the power system 30 of the passenger vehicle 14 for communication with the camera 20 and the power system 30.

In the illustrative embodiment, the controller 50 includes a memory 51, a processor 52, and a transceiver 53 as shown, diagrammatically, in FIG. 3. The memory 51 contains instructions for operation of the controller 50. The processor 52 is coupled to the memory 51 and is configured to execute the instructions contained in the memory 51. The transceiver 53 is coupled to processor 52 and is configured to send messages from and to receive messages for the processor 52.

Figure 6:
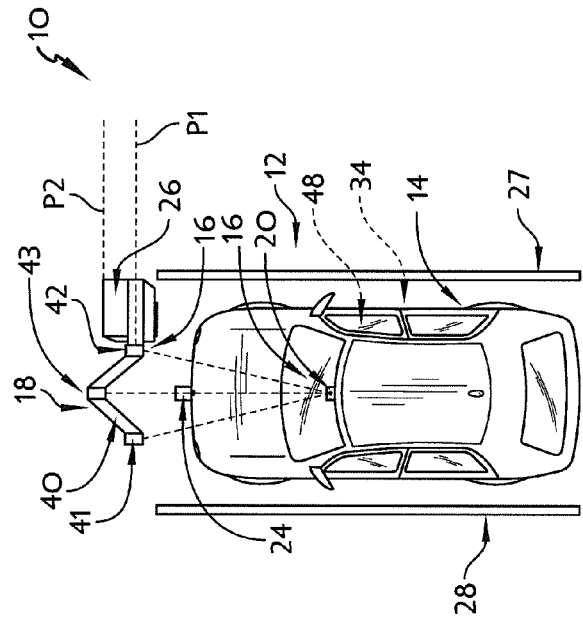
FIG. 6 is similar to FIG. 4 showing the passenger vehicle properly positioned within the charging station and showing the camera included in the positioning system detecting the set of beacons.
Figure 7:
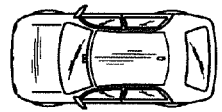
FIG. 7 is a screen shot presented on the display included in the positioning system in response to the proper positioning of the passenger vehicle in the charging station as shown in FIG. 6 showing that the display includes an in-position message.
Figure 5:
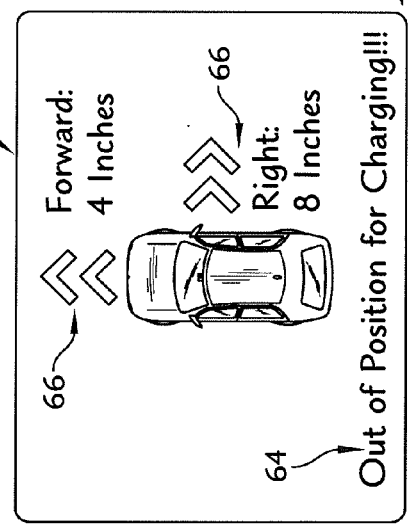
FIG. 5 is a screen shot presented on the display included in the positioning system in response to the improper positioning of the passenger vehicle in the charging station as shown in FIG. 4 showing that the display includes an out-of-position message and arrow indicators instructing a user how to reposition the passenger vehicle to be properly positioned within the charging station.

In the illustrative embodiment, the controller 50 is configured to display an out-of-position screen 60 on the display 48, as shown in FIG. 5, when the vehicle induction coil 34 included in the passenger vehicle 14 is out of position to receive power from the charger induction coil 24 included in the charging station 12 as shown in FIG. 4. Alternatively, the controller 50 is configured to display an in-position screen 62 on the display 48, as shown in FIG. 7, when the vehicle induction coil 34 included in the passenger vehicle 14 is in position to receive power from the charger induction coil 24 included in the charging station 12 as shown in FIG. 6. The controller 50 is also configured to initiate charging of the passenger vehicle 14 when the passenger vehicle 14 is in position and the battery 32 needs additional power.

Figures 8, 9:
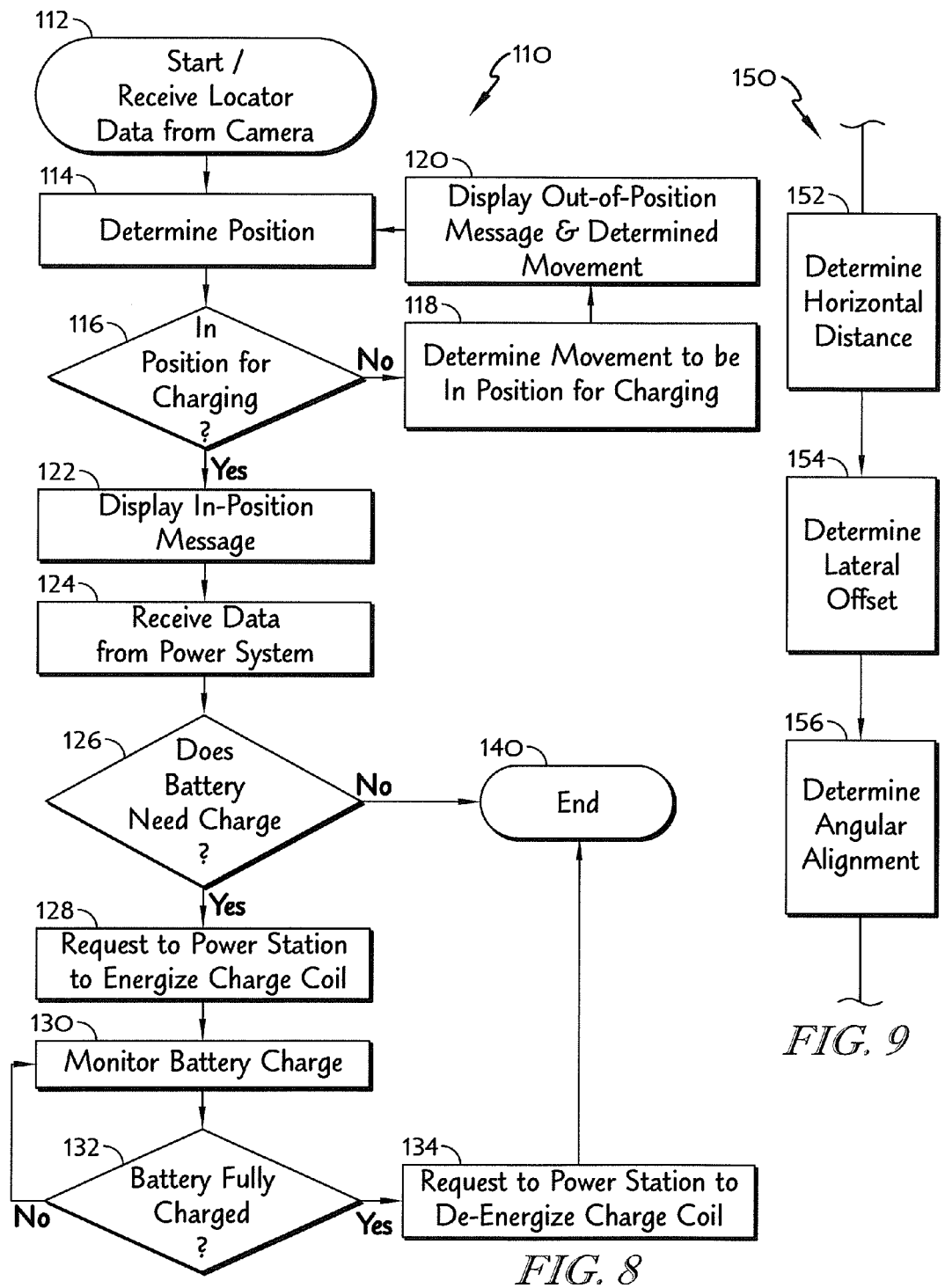
FIG. 8 is a flow chart showing a program performed by the controller included in the positioning system to guide the passenger vehicle into a predefined position within the charging station and to regulate vehicle charging to times when the passenger vehicle is properly positioned in the charging station.
FIG. 9 is a flow chart showing a sub-program performed by the controller included in the positioning system to determine the position of the passenger vehicle relative to the charging station.

More specifically, turning to FIG. 8, the memory 51 contains an algorithm (or program) 110 that is performed by the processor 52 during operation of the positioning system 16. In a first step 112 of the program 110, the controller 50 receives locator information corresponding to the position and of the beacons 41, 42, 43 within the field of view 45 of the camera 20. In a step 114, the controller 50 determines the position of the vehicle induction coil 34 relative to the charger induction coil 24 based on the information from the camera 20. In the illustrative embodiment, the position of the vehicle induction coil 34 relative to the charger induction coil 24 includes three components: a horizontal distance, a lateral offset, and an angular alignment. Then, in a step 116, the controller 50 decides if the vehicle induction coil 34 is in one of a number of predefined positions that allow efficient transmission of power from the charger induction coil 24.

If the vehicle induction coil 34 is not in one of the predefined positions, the controller 50 proceeds to a step 118 as shown in FIG. 8. In step 118, the controller 50 determines movement of the vehicle induction coil 34 (and of the passenger vehicle 14) needed to get the vehicle induction coil 34 into one of the predefined positions. Then, the controller 50 shows an out-of-position screen on the display 48 in a step 120. In the illustrative embodiment, the out-of-position screen includes an out-of-position message 64 and at least one indicator 66 showing the movement needed to reposition the vehicle induction coil 34 into one of the predefined positions relative to the charger induction coil 24 that is conducive to power transfer as shown in FIG. 5. Once the out-of-position screen is generated, the controller 50 loops back to step 114 to determine an updated position of the vehicle induction coil 34 and the passenger vehicle 14.

If the vehicle induction coil 34 is in one of the predefined positions, the controller 50 proceeds to a step 122 as shown in FIG. 8. In step 122, the controller shows an in-position screen on the display 48. In the illustrative embodiment, the in-position screen includes an in position message 68 as shown, for example, in FIG. 7.

When the vehicle induction coil 34 is in one of the predefined positions for power transfer from the charger induction coil 24, the controller 50 receives information from the power system 30 in a step 124 as shown in FIG. 8. In the illustrative embodiment, the information from the power system 30 includes the level of battery charge. The controller 50 then decides if the battery 32 needs additional charges based on the information received from the power system 30 in a step 126. If the battery 32 does not need additional charge, the controller 50 advances to the end 140 of program 110.

If the battery 32 does need additional charge, the controller 50 sends a request via the transceiver 53 to the power station 26 to energize the charger induction coil 24 in a step 128 as shown in FIG. 8. Then the controller 50 repeatedly monitors the battery 32 charge in a step 130 and decides if the battery 32 is fully charged in a step 132. When the controller 50 decides that the battery 32 is fully charged, the controller 50 sends a request via the transceiver 53 to the power station 26 to de-energize the charger induction coil 24 in a step 134 and then ends the algorithm at step 140.

Turning now to FIG. 9, calculation of each component of the position of the vehicle induction coil 34 relative to the charger induction coil 24 is performed in a sub-program 150. In a first step 152 of sub-program 150, the controller 50 determines a horizontal distance H by comparing an expected arrangement of the beacons 41, 42 corresponding to a predefined position with a detected arrangement of the beacons 41, 42 within the field of view 45 of the camera 20 as suggested in FIGS. 10 and 11.

Figures 10, 11:
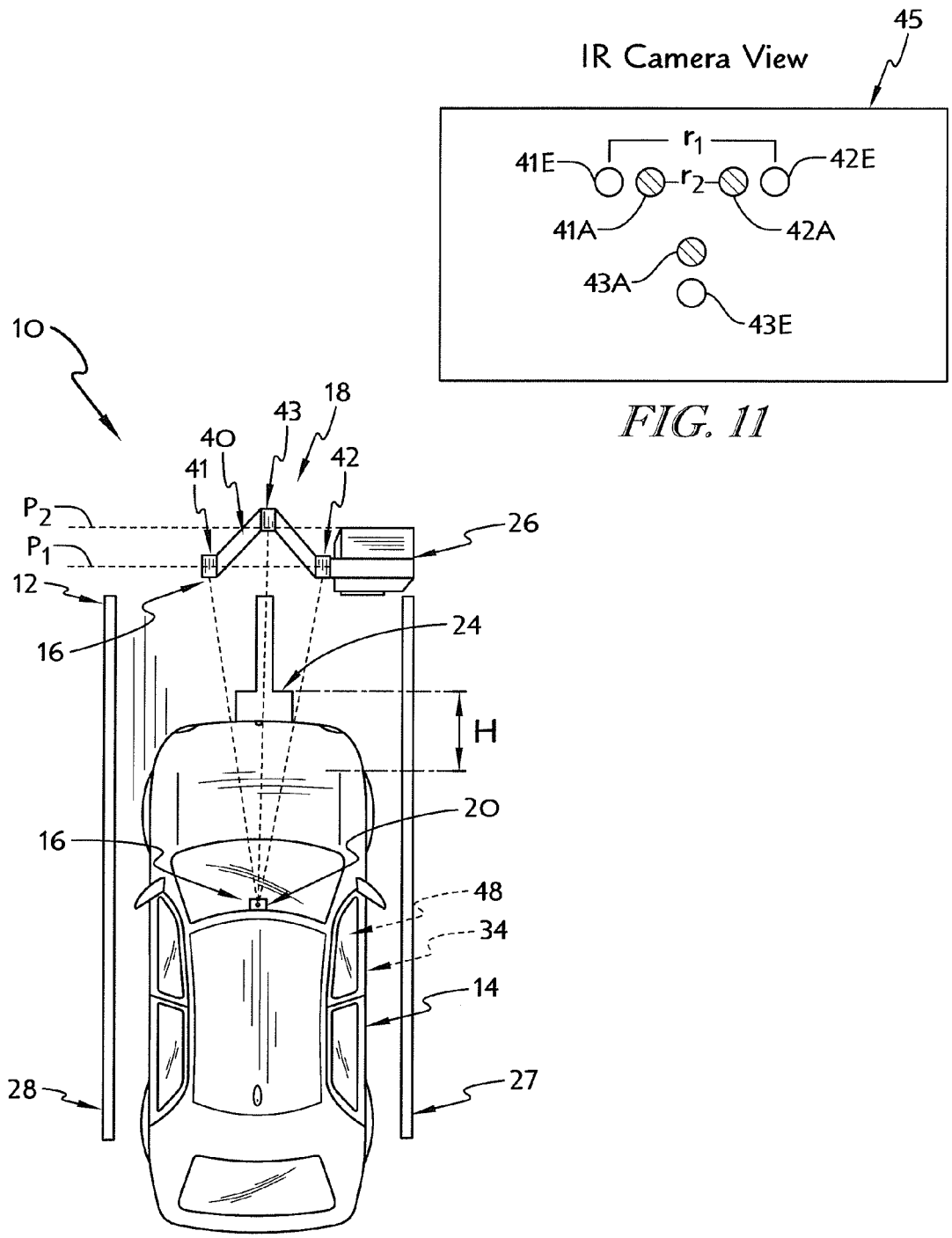
FIG. 10 is a top plan view the wireless charging station of FIGS. 1-3 showing the passenger vehicle spaced a horizontal distance apart from a predefined position within the charging station that allows charging and showing that the camera included in the positioning system detects the set of beacons while the passenger vehicle is out of position to determine the distance the passenger vehicle is spaced apart from the predefined position.
FIG. 11 is a view taken from the camera included in the positioning system when the passenger vehicle is spaced a horizontal distance apart from the predefined position within the charging station as shown in FIG. 10.

More specifically to determine the horizontal distance between the vehicle induction coil 34 and the charger induction coil 24, the controller 50 first determines a combined field of view ($\Theta_{FOV}$) based on the camera 20 using the equation:

$$\theta_{FOV} = \frac{\left(\frac{WFOV}{WPIXELS} + \frac{VHOV}{VPIXELS}\right)}{2}$$

in which WFOV is a width field of view angle, WPIXELS is the number of pixels along the width of the image produced by the camera 20, VHOV is a vertical field of view angle, and VPIXELS is the number of pixels produced along the height of the image produced by the camera 20. Next, the expected beacons 41E, 42E, 43E and the actually detected beacons 41A, 42A, 43A are plotted within the field of view 45 as shown in FIG. 11. Then the expected horizontal distance $HD_E$ from the charger induction coil 24 to the locator unit 18 is determined using the equation:

$$HD_E = \frac{r_1}{2\tan(\alpha_1)}$$

in which $r_1$ is equal to:

$$r_1 = \sqrt{(41Ex-42Ex)^2+(41Ey-42Ey)^2}$$

and in which $\alpha_1$ is equal to:

$$\alpha_1 = \frac{r_1 \theta_{FOV}}{2}$$

Next the actual horizontal distance $HD_A$ from the vehicle induction coil 34 to the locator unit 18 is determined using the equation:

$$HD_A = \frac{r_2}{2\tan(\alpha_2)}$$

in which $r_2$ is equal to:

$$r_2 = \sqrt{(41Ax-42Ax)^2+(41Ey-42Ey)^2}$$

and in which $\alpha_2$ is equal to:

$$\alpha_2 = \frac{r_2 \theta_{FOV}}{2}$$

Finally, the distance H is determined by comparing the actual horizontal distance to the expected horizontal distance using the equation:

$$H = HD_A - HD_E$$

Figure 13:
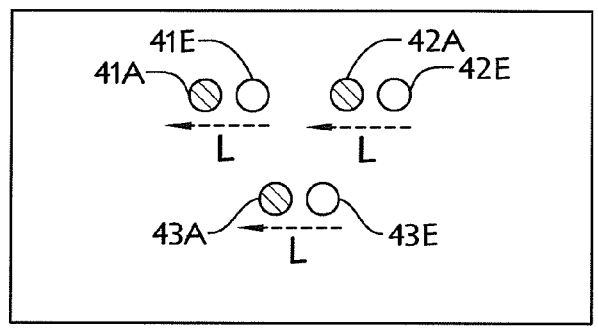
FIG. 13 is a view taken from the camera included in the positioning system when the passenger vehicle is laterally offset from the predefined position within the charging station as shown in FIG. 12.
Figure 12:
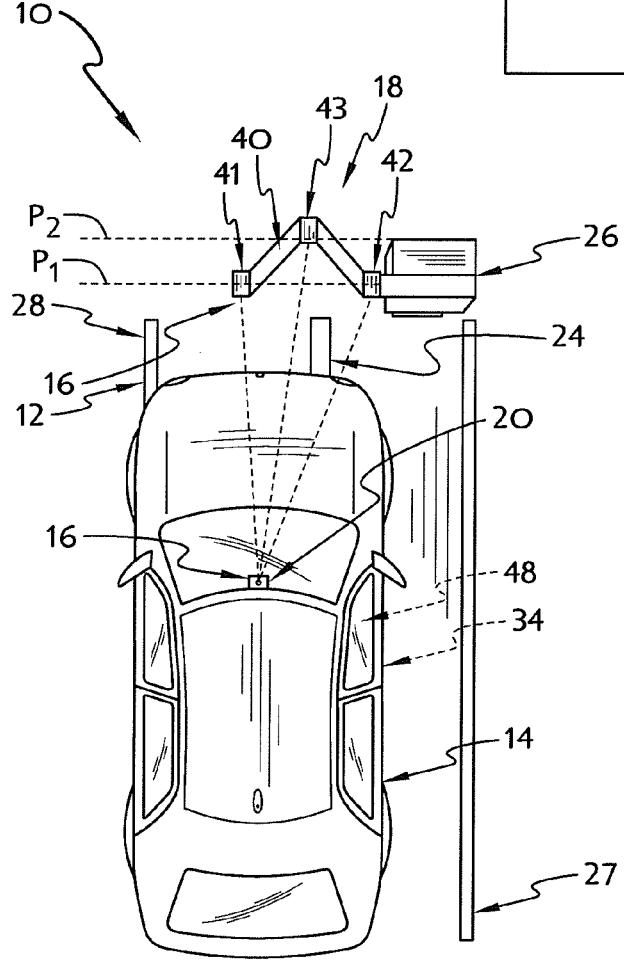
FIG. 12 is a top plan view the wireless charging station of FIGS. 1-3 showing the passenger vehicle laterally offset from a predefined position within the charging station that allows charging and showing that the camera included in the positioning system detects the set of beacons while the passenger vehicle is out of position to determine the distance the passenger vehicle is laterally offset from the predefined position.

In a step 154 of sub-program 150, the controller 50 determines the lateral offset of the vehicle induction coil 34 relative to the charger induction coil 24 as suggested in FIGS. 12 and 13. In step 154, the controller plots the actual beacons 41A, 42A, 43A and expected beacons 41E, 42E, 43E within the field of view 45 of the camera 20; and, then determines the lateral offset distance based on the spacing between the plotted beacons.

Figure 15:
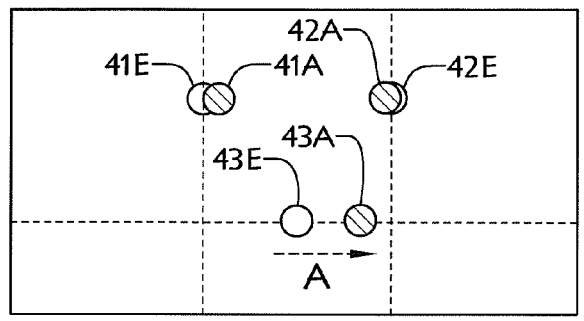
FIG. 15 is a view taken from the camera included in the positioning system when the passenger vehicle is angularly misaligned with the predefined position within the charging station as shown in FIG. 14.
Figure 14:
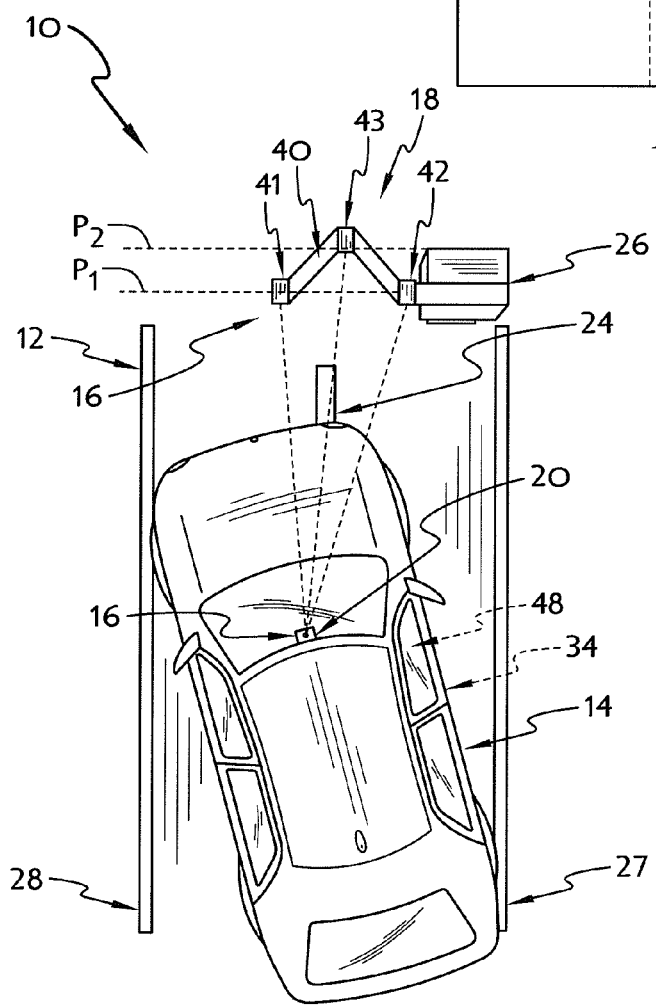
FIG. 14 is a top plan view the wireless charging station of FIGS. 1-3 showing the passenger vehicle angularly misaligned with a predefined position within the charging station that allows charging and showing that the camera included in the positioning system detects the set of beacons while the passenger vehicle is out of position to determine the angle of misalignment.

In a step 156 of sub-program 150, the controller 50 determines the angular alignment of the vehicle induction coil 34 and the charger induction coil 24 relative to the locator unit 18 as suggested in FIGS. 14 and 15. In step 156, the controller plots the actual beacons 41A, 42A, 43A and expected beacons 41E, 42E, 43E within the field of view 45 of the camera 20;

and, then determines the angular alignment based on the spacing between the plotted beacons.

In some embodiments, the control system 44 provides the guidance information derived from the positioning system 16 to an autonomous pilot unit rather than to a driver of the passenger vehicle 14. In such embodiments, the autonomous pilot unit can move the vehicle induction coil 34 included the passenger vehicle 14 into one of the predefined positions relative the charger induction coil 24 that allows charging without (or with reduced) driver intervention.

Figure 16:
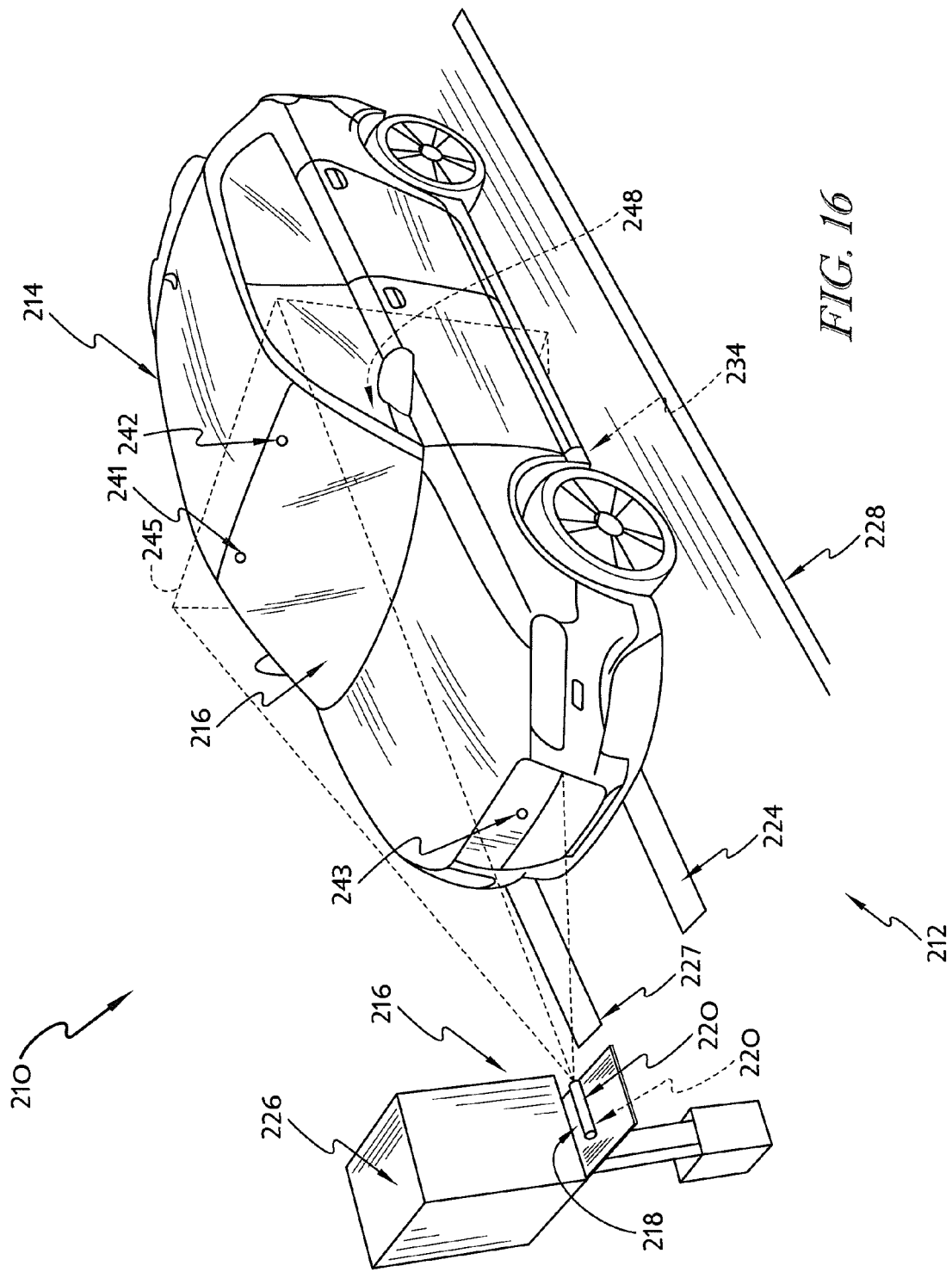
FIG. 16 is a perspective view of another wireless vehicle charging system similar to the wireless vehicle charging system shown in FIGS. 1-15 showing that a positioning system included in the other wireless vehicle charging system has a camera mounted in the charging station and a set of beacons mounted to the passenger vehicle.
Figure 17:
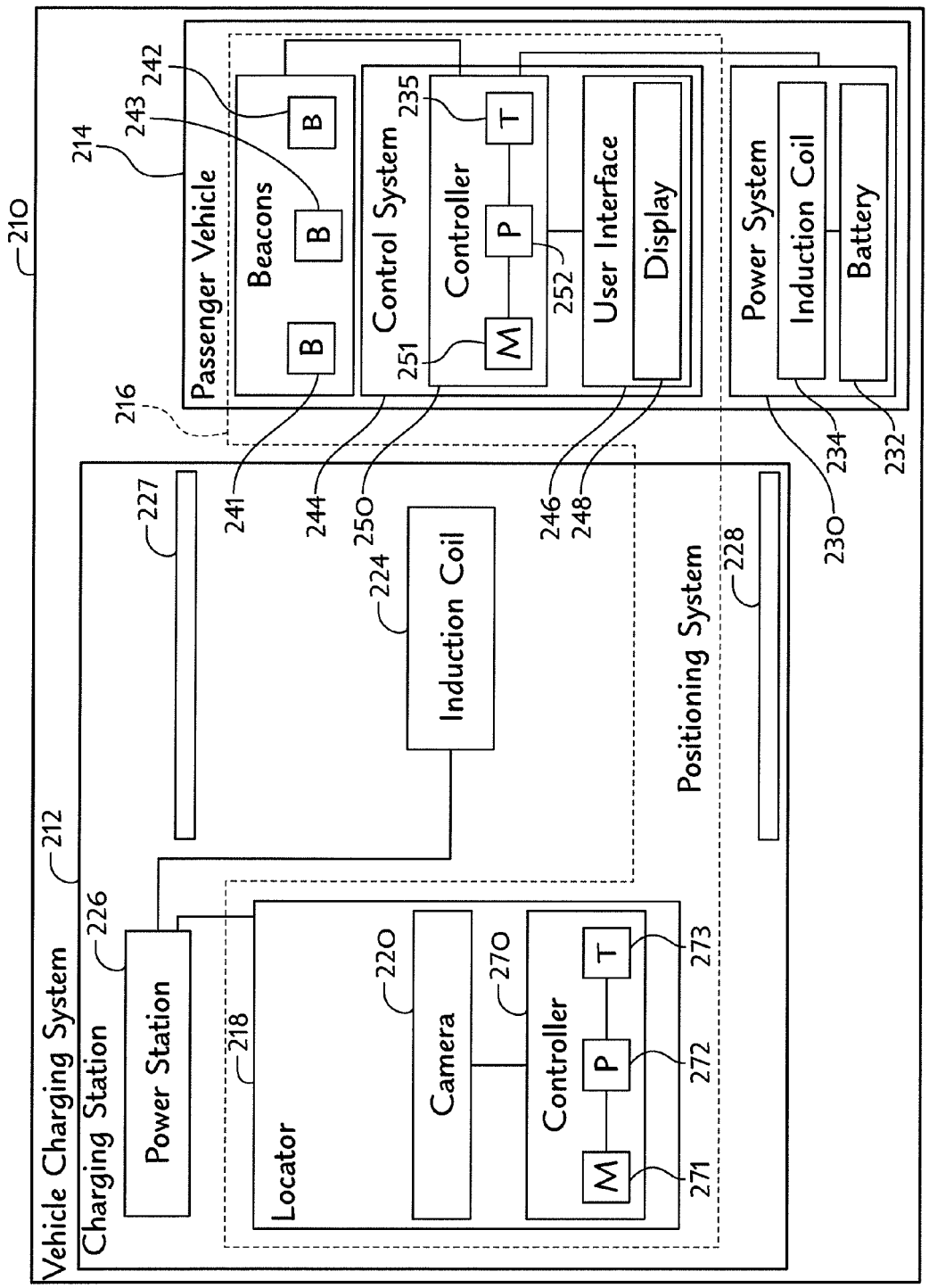
FIG. 17 is a diagrammatic view of the wireless vehicle charging system of FIG. 16 showing that the positioning system also has a control system including a controller and a display mounted to the passenger vehicle.

Another illustrative wireless vehicle charging system 210 is shown in FIGS. 16 and 17. The charging system 210 is substantially similar to the charging system 10 shown in FIGS. 1-15 and described herein. Accordingly, similar reference numbers in the 200 series indicate features that are common between the charging system 10 and the charging system 210. The description of the charging system 10 is hereby incorporated by reference to apply to the charging system 210, except in instances when it conflicts with the specific description and charging system 210.

Unlike charging system 10, the positioning system 216 of the charging system 210 includes a camera 220 mounted in a predetermined position in the charging station 212 as part of the locator 18 and a set of beacons 241, 242, 243 mounted to the passenger vehicle 14 as shown in FIGS. 16 and 17. To accommodate the relocation of the camera 220 into the locator 218, the locator 218 also includes a controller 270 coupled to the camera 220 as shown in FIG. 17.

The controller 270 includes a memory 271, a processor 272, and a transceiver 273. The transceiver 273 of the controller 270 cooperates with the memory 271 and the processor 272 to communicate information from the camera 220 to the control system 244 mounted in the passenger vehicle 214. Thus, the control system 244 receives information from the camera 220 that is used to establish the position of the vehicle induction coil 234 relative to the charger induction coil included in the charging station 212. The control system 244 can then generate and present a screen on the display 248 to guide a driver (or an autonomous piloting system) moving the vehicle 214 toward the charging station 212 and into a predefined position in which power can be transferred from the charger induction coil 224 to the vehicle induction coil 234.

Many electric and hybrid passenger vehicles include batteries adapted to be charged by external charging stations. Some such passenger vehicles include vehicle-side induction coils for wirelessly receiving power to recharge their batteries from charger-side induction coils spaced apart from the vehicle-side induction coils. The use of spaced apart induction coils to charge a battery in a passenger vehicle presents technical problems relating to proper location/orientation of the vehicle-side induction coil relative to the charger-side induction coil to allow power to be transmitted from the charger-side induction coil to the vehicle-side induction coil.

Embodiments of the present disclosure provide a solution to the technical problem that vehicle-side induction coils may be difficult to properly locate relative to charger-side induction coils to allow power to be transmitted to the vehicle-side induction coil. Specifically, the present disclosure provides a positioning system for guiding a driver moving a passenger vehicle into a charging station so that the a vehicle-side induction coil is arranged in the predefined position relative to a charger-side induction coil that allows receipt of power by the vehicle-side induction coil.

Although certain illustrative embodiments have been described in detail above, variations and modifications exist within the scope and spirit of this disclosure as described and as defined in the claims included in this application.

The invention claimed is:

1. A vehicle charging system comprising
a charger induction coil,
a passenger vehicle including a rechargeable battery and a vehicle induction coil coupled to the rechargeable battery, the vehicle induction coil configured to wirelessly receive power from the charger induction coil and to transmit power from the charger induction coil to the rechargeable battery, and
a positioning system including at least one beacon, a camera configured to detect the at least one beacon, and a control system in communication with the camera to receive information associated with the at least one beacon, the control system being configured to determine a position of the vehicle induction coil relative to the charger induction coil based on information from the camera and to communicate to a driver an in-position message when the vehicle induction coil is in a predefined position that allows receipt of power from the charger induction coil or an out-of-position message when the vehicle induction coil is not in a predefined position that allows receipt of power from the charger induction coil so that the driver can adjust the position of the passenger vehicle along with the vehicle induction coil to establish charging of the rechargeable battery,
wherein the at least one beacon includes at least three light-emitting beacons arranged in two spaced apart vertical planes,
wherein each light-emitting beacon emits infrared light and the camera is configured to detect infrared light.

2. The vehicle charging station of claim 1, wherein the at least three light-emitting beacons are arranged in predefined positions relative to the charger induction coil and the camera is coupled to the passenger vehicle for movement with the passenger vehicle.

3. The vehicle charging system of claim 1, wherein the control system is coupled to the passenger vehicle for movement therewith.

4. The vehicle charging system of claim 3, wherein the control system includes a display configured to show the in-position message and the out-of-position message and a controller configured to determine the position of the vehicle induction coil relative to the charger induction coil and to provide the in-position message or the out-of-position message to the display based on information received from the camera.

5. The vehicle charging system of claim 4, wherein the out-of-position message includes at least one indicator associated with movement of the passenger vehicle needed to move the vehicle induction coil toward the predefined position that allows efficient receipt of power from the charger induction coil.

6. The vehicle charging system of claim 1, wherein the position determined by the control system includes a horizontal-distance component associated with a horizontal distance of the vehicle induction coil from the charger induction coil.

7. The vehicle charging system of claim 6, wherein the position determined by the control system includes a lateral-offset component associated with a lateral offset of the vehicle induction coil relative to the charger induction coil.

8. The vehicle charging system of claim 7, wherein the position determined by the control system includes an angular-alignment component associated with an angle formed between the vehicle induction coil and the charger induction coil relative to the at least one beacon.

9. A passenger vehicle comprising
a power system including a rechargeable battery and a vehicle induction coil coupled to the battery, the vehicle induction coil configured to wirelessly receive power from a charger induction coil and to transmit power from a charger induction coil to the rechargeable battery,
a camera configured to detect light-emitting beacons, and
a controller coupled to the camera and configured to receive information from the camera and to determine a position of the vehicle induction coil relative to a charger induction coil based on the information received from the camera,
wherein the controller is configured to identify information form the camera associated with camera detection of a plurality of light emitting beacons arranged in predefined positions in two vertical planes and to determine a position of the vehicle induction coil relative to a charger induction coil based on the identified information.

10. The passenger vehicle of claim 9, wherein the plurality of light emitting beacons comprise at least three light emitting beacons.

11. The passenger vehicle of claim 9, further comprising a display coupled to the controller, wherein the controller is configured to provide an in-position message to the display when the vehicle induction coil is determined to be in a predefined position relative to a charger induction coil and to provide an out-of-position message to the display when the vehicle induction coil is determined not to be in the predefined position relative to a charger induction coil.

12. The passenger vehicle of claim 9, further comprising a display coupled to the controller, wherein the controller is configured to determine movement needed to move the vehicle induction coil toward the predefined position and to provide at least one indicator to the display associated with determined movement.

13. The vehicle charging system of claim 12, wherein the determined movement includes a horizontal-distance component and the at least one indicator is suggestive of movement in a horizontal direction.

14. The vehicle charging system of claim 13, wherein the determined movement includes a lateral-offset component and the at least one indicator is suggestive of movement in a lateral direction.

15. The vehicle charging system of claim 14, wherein the determined movement includes an angular-alignment component and the at least one indicator instructive of movement to change an angle formed by the vehicle induction coil and a charger induction coil included in a charging station.

16. The passenger vehicle of claim 9, wherein the controller is configured to send a signal to request that a charger induction coil be energized when the vehicle induction coil is determined to be in a predefined position relative to a charger induction coil included in a charging station.

17. A method of operating a vehicle charging system, the method comprising
receiving information from an infrared camera associated with at least one light-emitting beacon,
determining a position of a vehicle induction coil relative to a charger induction coil based on the information received from the infrared camera, and
communicating to a driver an in-position message when the vehicle induction coil is properly positioned in a predefined position or an out-of-position message when the vehicle induction coil is not in the predefined position
wherein the information received from the camera is associated with at least three light-emitting beacons arranged in two vertical planes.

18. The method of claim 17, further comprising determining at least one movement needed to move the vehicle induction coil toward the predefined position and communicating to a driver the determined at least one movement as part of the out-of-position message.

19. The method of claim 18, wherein the in-position message and the out-of-position message are communicated through a display included in the passenger vehicle.

20. The method of claim 17, further comprising energizing the charger induction coil when the vehicle induction coil is properly positioned in the predefined position.

21. The method of claim 17, wherein determining the position of the vehicle induction coil relative to the charger induction coil includes determining a horizontal distance of the vehicle induction coil from the charger induction coil.

22. The method of claim 21, wherein determining the position of the vehicle induction coil relative to the charger induction coil includes determining a lateral offset of the vehicle induction coil relative to the charger induction coil.

23. The method of claim 22, wherein determining the position of the vehicle induction coil relative to the charger induction coil includes determining an angle formed between the vehicle induction coil and the charger induction coil relative to the at least three light-emitting beacons.

* * * * *